(12) United States Patent
Pesyna (10) Patent No.: US 9,464,594 B2
(45) Date of Patent: Oct. 11, 2016

(54) COMPACT ACTUATION SYSTEM FOR FLOW NOZZLE

(71) Applicant: Rolls-Royce North American Technologies, Inc., Indianapolis, IN (US)

(72) Inventor: Kenneth M. Pesyna, Carmel, IN (US)

(73) Assignee: Rolls-Royce North America Technologies, Inc., Indianapolis, IN (US)

( * ) Notice: Subject to any disclaimer, the term of this patent is extended or adjusted under 35 U.S.C. 154(b) by 257 days.

(21) Appl. No.: 14/209,749

(22) Filed: Mar. 13, 2014

(65) Prior Publication Data

US 2015/0129676 A1    May 14, 2015

Related U.S. Application Data

(60) Provisional application No. 61/786,055, filed on Mar. 14, 2013, provisional application No. 61/780,807, filed on Mar. 13, 2013, provisional application No. 61/780,772, filed on Mar. 13, 2013.

(51) Int. Cl.
*F02K 1/12* (2006.01)
*F02K 1/15* (2006.01)
(Continued)

(52) U.S. Cl.
CPC ........... *F02K 1/1223* (2013.01); *F02K 1/1207* (2013.01); *F02K 1/1238* (2013.01);
(Continued)

(58) Field of Classification Search
CPC .. F02K 1/1223; F02K 1/1207; F02K 1/1238; F02K 1/15; F02K 1/80; F02K 3/075; F02K 3/077; F02K 3/115

USPC ............... 60/770, 771, 226.1, 226.3; 239/265.11–265.43
See application file for complete search history.

(56) References Cited

U.S. PATENT DOCUMENTS 2,811,831 A * 11/1957 Geary ............... F02K 1/1207
                                                   239/265.39
2,932,163 A    4/1960 Hyde
(Continued)

FOREIGN PATENT DOCUMENTS

| | | |
|---|---|---|
| EP | 0833047 A2 | 4/1998 |
| EP | 1052395 A1 | 11/2000 |
| GB | 2429242 A | 2/2007 |

OTHER PUBLICATIONS

International Search Report PCT/US2014/026809 mailed on Aug. 6, 2014.

*Primary Examiner* — Steven Sutherland
(74) *Attorney, Agent, or Firm* — Fishman Stewart PLLC (57) ABSTRACT

Embodiments may include an actuation system for an exhaust nozzle of a gas turbine engine. The actuation system may comprise a plurality of flap assemblies including a plurality of convergent flaps movable between first and second convergent positions and a plurality of divergent flaps movable between first and second divergent positions. Each of the plurality of divergent flaps may extend from a respective one of the plurality of convergent flaps. The system may further include a first sync ring rotatably carried by an engine body and configured to synchronously move the divergent flaps between the first and second divergent positions and a second sync ring rotatably carried by the engine body and configured to synchronously move the convergent flaps between the first and second convergent positions. A method may translate rotation of the sync ring to movement of a vehicle surface between radially outward and inward positions.

17 Claims, 10 Drawing Sheets

(51) Int. Cl.
*F02K 3/075* (2006.01)
*F02K 3/077* (2006.01)
*F02K 3/115* (2006.01)
*F02K 1/80* (2006.01)

(52) U.S. Cl.
CPC .............. *F02K 1/15* (2013.01); *F02K 1/80* (2013.01); *F02K 3/075* (2013.01); *F02K 3/077* (2013.01); *F02K 3/115* (2013.01); *F05D 2250/411* (2013.01); *F05D 2260/50* (2013.01); *F05D 2260/56* (2013.01); *F05D 2270/051* (2013.01); *F05D 2270/66* (2013.01); *Y02T 50/671* (2013.01)

(56) References Cited

U.S. PATENT DOCUMENTS

| | | | | |
|---|---|---|---|---|
| 3,214,904 | A * | 11/1965 | Bailey | F02K 1/1269 239/265.17 |
| 3,638,428 | A | 2/1972 | Shipley et al. | |
| 4,043,509 | A * | 8/1977 | McHugh | F02K 1/1269 239/265.41 |
| 5,082,182 | A * | 1/1992 | Bruchez, Jr. | F02K 1/008 239/265.19 |
| 5,150,839 | A * | 9/1992 | Reedy | F02K 1/008 239/265.19 |
| 5,239,815 | A | 8/1993 | Barcza | |
| 5,335,489 | A | 8/1994 | Thayer | |
| 5,485,959 | A * | 1/1996 | Wood | F02K 1/002 239/265.19 |
| 5,613,636 | A | 3/1997 | Zubillaga et al. | |
| 5,797,544 | A | 8/1998 | Ward | |
| 6,212,877 | B1 * | 4/2001 | Renggli | F02K 1/008 239/265.35 |
| 6,299,077 | B1 * | 10/2001 | Harmon | F02K 1/1223 239/265.19 |
| 6,378,781 | B1 | 4/2002 | Vicario | |
| 7,225,622 | B2 | 6/2007 | Petty et al. | |
| 7,546,738 | B2 | 6/2009 | Peters | |
| 7,588,415 | B2 | 9/2009 | Giaimo et al. | |
| 7,721,551 | B2 | 5/2010 | Hanson | |
| 7,874,160 | B2 | 1/2011 | Swanson et al. | |
| 8,020,386 | B2 | 9/2011 | Cowan et al. | |
| 2007/0062199 | A1 | 3/2007 | Cowan et al. | |
| 2008/0072604 | A1 | 3/2008 | Swanson et al. | |
| 2011/0088403 | A1 | 4/2011 | Swanson et al. | |

* cited by examiner

FIG. 24

COMPACT ACTUATION SYSTEM FOR FLOW NOZZLE

CROSS-REFERENCE TO RELATED APPLICATIONS

This application claims priority to U.S. Provisional Patent Application No. 61/786,055, filed Mar. 14, 2013, and U.S. Provisional Patent Application No. 61/780,807, filed Mar. 13, 2013, now U.S. patent application Ser. No. 14/209,806, titled "THREE STREAM, VARIABLE AREA FIXED APERTURE NOZZLE WITH PNEUMATIC ACTUATION," and U.S. Provisional Patent Application No. 61/780,772, filed Mar. 13, 2013, now U.S. patent application Ser. No. 14/209,687, titled "THREE STREAM, VARIABLE AREA, VECTORABLE NOZZLE," the contents of which are all hereby incorporated in their entirety.

FIELD OF TECHNOLOGY

The disclosure generally relates to vehicle actuation systems, more particularly, nozzles and guide vanes for gas turbine engines and the associated systems and processes for actuating variable area nozzles and guide vanes.

BACKGROUND

Traditional gas turbine engines may include exhaust nozzles having a nozzle geometry and guide vanes designed to manage flow with respect to the engine or control the thrust produced by the engine. The nozzle geometry may include a generally decreasing diameter convergent section followed by an increasing diameter divergent section. Traditional gas turbine engines may include somewhat large and overly complex systems that may lack the ability to control multiple or variable flow streams and synchronize the actuation systems of a variable internal area nozzle as well as the guide vanes.

There exists a need for variable nozzles and guide vanes for a gas turbine engine with a construction optimized to decrease external drag and increase internal efficiency and control of the engine. Further, there exists a need for a nozzle with convergent and divergent actuation systems that may be synchronized and may control fixed and variable flow streams. Moreover, there exists a need for variable guide vanes that may be synchronized and may control fixed and variable flow streams.

BRIEF DESCRIPTION OF THE DRAWINGS

While the claims are not limited to a specific illustration, an appreciation of the various aspects is best gained through a discussion of various examples thereof. Referring now to the drawings, exemplary illustrations are shown in detail. Although the drawings represent the illustrations, the drawings are not necessarily to scale and certain features may be exaggerated to better illustrate and explain an innovative aspect of an example. Further, the exemplary illustrations described herein are not intended to be exhaustive or otherwise limiting or restricted to the precise form and configuration shown in the drawings and disclosed in the following detailed description. Exemplary illustrations are described in detail by referring to the drawings as follows:

DETAILED DESCRIPTION

Referring to the Figures, an exemplary nozzle (hereinafter "nozzle") may have a three-stream variable internal flow area and fixed overall exit aperture for a high performance gas turbine engine. The nozzle may utilize a pneumatic system to operate multiple convergent-divergent flap assemblies to provide a combination of flow streams to accommodate various flight operating conditions while maintaining the fixed exit aperture. However, the nozzle may be operated by other non-pneumatic systems and integrated in other suitable applications. Furthermore, the nozzle may include a variable exit aperture.

An exemplary actuation system for a nozzle of a gas turbine engine may comprise a plurality of flap assemblies including a plurality of convergent flaps movable between first and second convergent positions and a plurality of divergent flaps movable between first and second divergent positions. Each of the plurality of divergent flaps may extend from a respective one of the plurality of convergent flaps. The system may further include a first sync ring rotatably carried by an engine body and configured to synchronously move the divergent flaps between the first and second divergent positions and a second sync ring rotatably carried by the engine body and configured to synchronously move the convergent flaps between the first and second convergent positions. A further exemplary actuation system may comprise a first plurality of bell cranks coupled to the first sync ring and a first plurality of connecting links and a second plurality of bell cranks coupled to the second sync ring and a second plurality of connecting links. Each bell crank may be configured to translate rotation from the first or second sync ring to a respective connecting link. Thus, rotation from the first and second sync rings may be translated to move respective divergent and convergent flaps.

An exemplary method of operating an actuation system may comprise rotating a sync ring about a central axis with an actuator. The sync ring may be operatively connected to an input arm of a bell crank with the bell crank being rotatable about a radial axis perpendicular to the central axis. Further, the method may comprise translating the rotation of the sync ring to a connecting link with an output arm of the bell crank, urging the connecting link in an axial direction with the output arm of the bell crank, and moving a vehicle surface to a radially outward or inward position with the connecting link. Thus, a method may translate rotation of the sync ring to movement of a vehicle surface between radially outward and inward positions.

Figure 1:
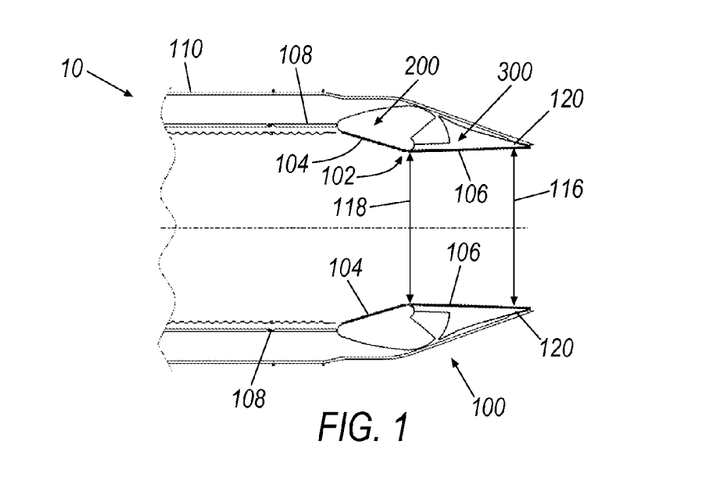
FIG. 1 illustrates a schematic view of an exemplary nozzle of an exhaust side of an engine of the present disclosure, for example, showing the nozzle in a first configuration or afterburner mode.

Exemplary engine 10 may include a gas turbine engine having a nozzle 100, for example an exhaust nozzle. FIG. 1. Nozzle 100 may include convergent actuation system 200 and divergent actuation system 300. Nozzle 100 may include a plurality of convergent-divergent flap assemblies 102 with a plurality of convergent or primary flaps 104 of convergent actuation system 200 and a plurality of divergent or secondary flaps 104 of divergent actuation system 300. Flap assemblies 102 may be disposed in and extend around a shroud 110 of engine 10. Convergent flaps 104 may be pivotally attached to an engine body 108 and be movable between first and second convergent positions including any position therebetween. Divergent flaps 104 may be pivotally attached to a respective one of the convergent flaps 104 and be movable between first and second divergent positions including any position therebetween. The nozzle 100 may also pneumatically control and pivot the convergent and divergent flaps 104, 108 between a radially inward position and a radially outward position to pass a combination of streams through an exit area 116 of the engine 10.

Nozzle 100 may define a series of passages for respective streams. Nozzle 100 may include throat passage 118, variable area passages 120, and fixed area passages 122 (not shown). Throat passage 118 may be configured to pass a primary stream including mixed core and bypass flows. Furthermore, variable area passages 120 may be spaced apart from each other along a periphery of the throat passage 118 and configured to pass a variable area third stream that may bypass a heat exchanger. In addition, fixed area passages 122 or slots may be spaced apart from each other along the periphery of the throat passage 118, e.g., radially disposed in 180, 120, 90, or 60 degree increments, and may alternate positions with the variable area passages 120, e.g., radially disposed in 180, 120, 90, or 60 degree increments. The fixed area passages 122 may be configured to pass a fixed area third stream that is exhausted from the heat exchanger. In this respect, the nozzle may be utilized to exhaust an incremented third stream flow.

All combined streams may exit through the exit area 116. Exit area 116 may be fixed. Exit area 116 may also have any suitable shape, for example, including circular, rectangular, or elliptical. These shapes may improve control of the flow divergence through the flow path of the nozzle and may also decreasing the boat tail angle. This shape may depend on the flaps and other architecture chosen for the nozzle.

Convergent-divergent flaps 104, 108 may be configured to control the streams. The convergent flaps 104 may be configured to define the minimum throat passage 118 of the primary stream. The divergent flaps 108 may be configured to control the area of the third stream. At maximum power takeoff conditions or afterburning conditions as shown in FIG. 1, the convergent flaps 104 and the divergent flaps 108 can be pivoted radially outward to substantially block the third stream to increase the jet thrust through the primary stream. The shaping of these flaps may increase the overall performance of the combined flows.

The exit area 116 may be sized based on a diffusion factor from the maximum area of the throat passage 118 to provide, for example, in an afterburning mode. An exemplary exit area 116 may have a fixed area resulting in overexpansion of the nozzle 100 during most operating conditions. However, the third stream may act like a supersonic ejector at these conditions, filing the plenum and minimizing the overexpansion that the primary stream would otherwise see. The result may be higher performance across vastly different flight conditions while keeping a fixed exit area. The fixed exit area may provide a clean external surface and therefore decrease drag.

The variable internal area nozzle 100 with fixed exit area 116 may be capable of high performance during various flight conditions by actuating internal nozzle geometry by the use of at least two sets of flaps. Furthermore, the nozzle 100 may use the engine third stream flow as a supersonic ejector at conditions where the nozzle 100 would otherwise be over expanded to minimize nozzle losses. This may alleviate the trade between cruise mode and afterburning mode performance that would otherwise be expected for a fixed exit area nozzle.

Nozzle 100 may be configured for a number of configurations or flight modes, for example afterburner mode, military power mode, and cruise mode. Afterburner mode may provide increased thrust by injecting additional fuel downstream of the turbine of engine 10, e.g. for supersonic flight, takeoff, and combat situations. Military power mode may include a maximum power setting of engine 10 without afterburner. Cruise mode may include less than maximum power setting of engine 10 with a variable third stream, e.g. for cooling. Although these flight modes are provided for exemplary purposes, embodiments may include any combination of these flight modes or any other mode.

A basic arrangement of the geometry of an exemplary configuration of the nozzle 100 with a maximum throat stream flow and a minimum third stream flow, e.g. a first configuration or afterburner mode. In particular, the convergent flaps 104 may be opened to increase throat passage 118, while the divergent flaps 104 may close the variable area passage 120.

Figure 2:
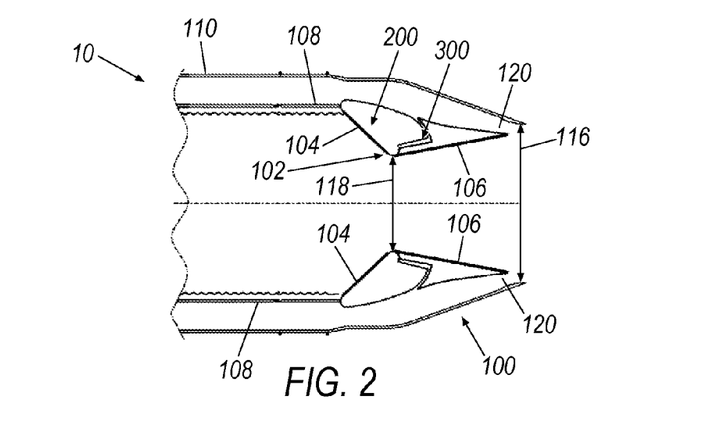
FIG. 2 illustrates a schematic view of the exemplary nozzle of FIG. 1, for example, showing the nozzle in a second configuration or military power mode.

FIG. 2 shows the basic arrangement of the geometry of an exemplary configuration of nozzle 100 with the minimum primary throat passage 118 and minimum third stream area 120, e.g. a second configuration or military power mode. In this respect, the convergent flaps 104 may be closed to reduce throat passage 118, while the divergent flaps 104 may close the variable area passage 120.

Figure 3:
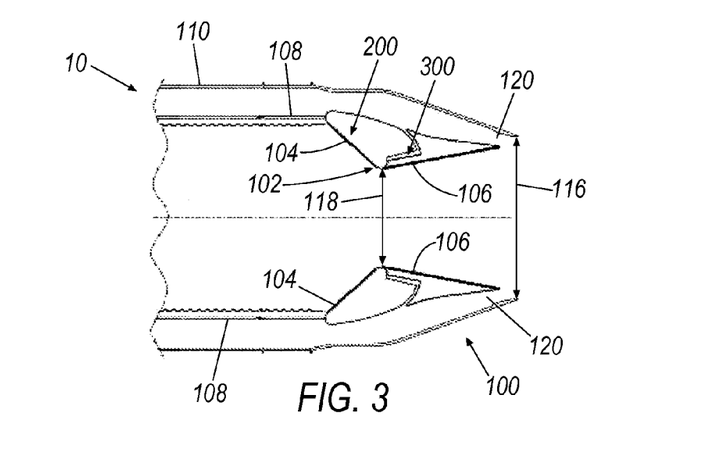
FIG. 3 illustrates a schematic view of the exemplary nozzle of FIG. 1, for example, showing the nozzle in a third configuration or cruise mode.

FIG. 3 shows the basic arrangement of the geometry of an exemplary configuration of nozzle 100 with the minimum throat passage 118 and maximum variable third stream area 120, e.g. cruise mode. In this respect, the convergent flaps 104 may be closed to a desired throat passage 118, while the divergent flaps 104 may open the variable area passage 120.

Nozzle 100 may further include actuation system 200 and sync system 300. Sync system 300 may be connected to actuation system 200 to operate flap assemblies 102. Rotational motion of sync system 300 may be translated through actuation system 200 to move flap assemblies 102 between the first, second, and third configurations.

Figure 4:
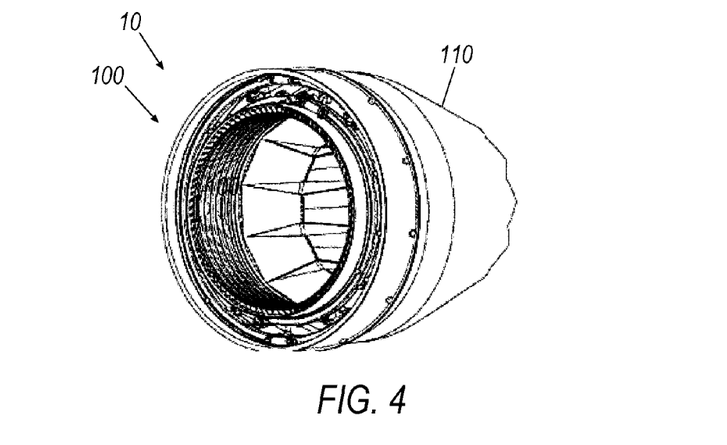
FIG. 4 illustrates a front perspective view of an exemplary nozzle.
Figure 5:
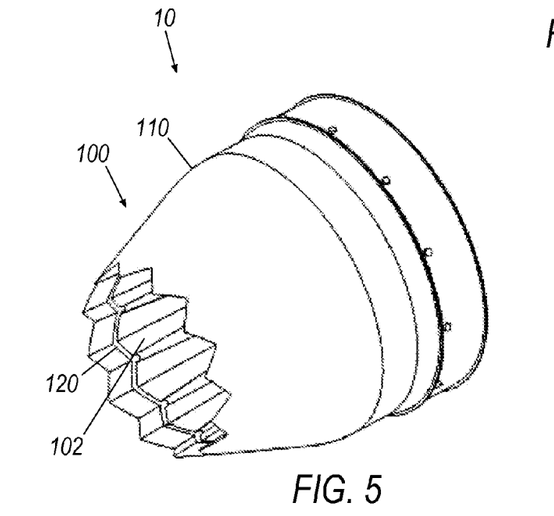
FIG. 5 illustrates a rear perspective view of the exemplary nozzle of FIG. 4, for example, in the first or second configuration.
Figure 6:
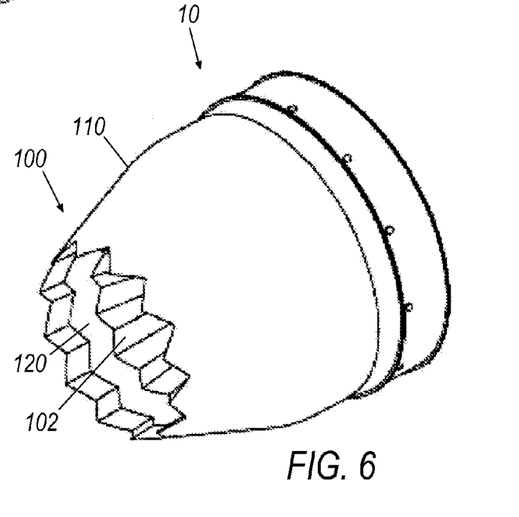
FIG. 6 illustrates a rear perspective view of the exemplary nozzle of FIG. 4, for example, in the third configuration.
Figure 7:
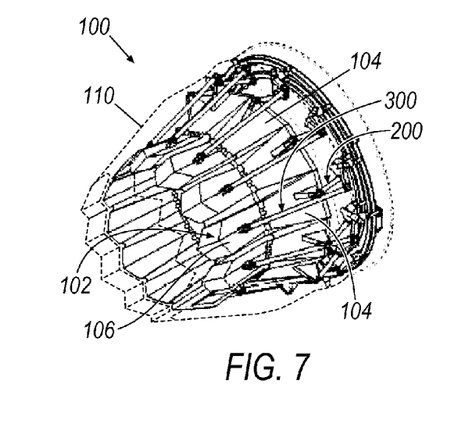
FIG. 7 illustrates a perspective view of the nozzle of FIG. 5 with the shroud shown in ghost lines and with the nozzle, for example, in the first or second configuration.
Figure 8:
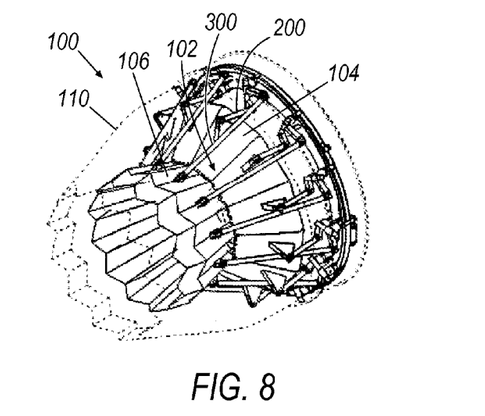
FIG. 8 illustrates a perspective view of the nozzle of FIG. 6 with the shroud in ghost lines and with the nozzle, for example, in the third configuration.
Figure 9:
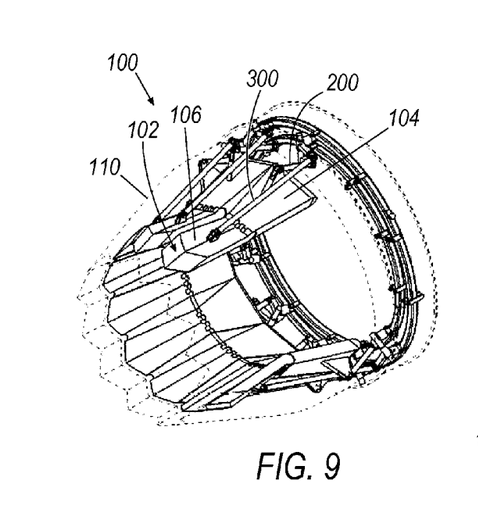
FIG. 9 illustrates an enlarged perspective cutaway view of the nozzle of FIG. 7.
Figure 10:
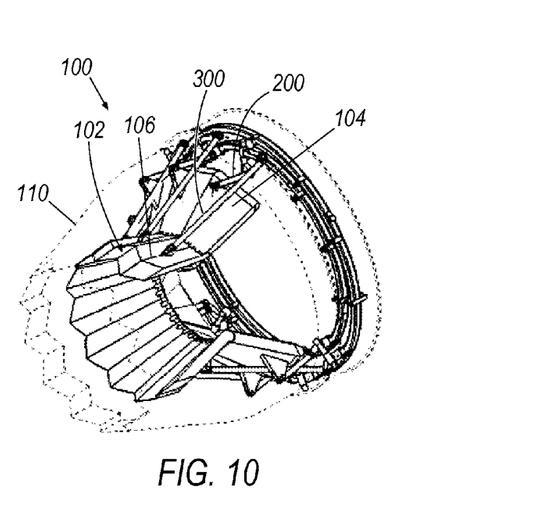
FIG. 10 illustrates an enlarged perspective cutaway view of the nozzle of FIG. 8.

Referring to FIGS. 4-6, nozzle 100 may include shroud 110, convergent actuation system 200, and divergent actuation system 300. Divergent actuation system 200 and convergent actuation system 300 may include sync rings (described in further detail below) that may be configured to synchronize actuation of the convergent-divergent flap assemblies 102. Nozzle 100 may include the first and second conditions that may close the variable area passage 120, as shown in FIG. 5. Nozzle 100 may include the third condition that may open the variable area passage 120, as shown in FIG. 6.

FIGS. 7-10 illustrate nozzle 100 with shroud 110 shown in ghost lines to show convergent actuation system 200 and divergent actuation system 300. Convergent actuation system 200 and divergent actuation system 300 may actuate convergent flaps 104 and divergent flaps 106, respectively, between the radially outward position (e.g. FIG. 7) and the radially inward position (e.g., FIG. 8). Specifically, convergent actuation system 200 may rotate convergent flaps 104 between the radially outward position (e.g. FIG. 9) and the radially inward position (e.g., FIG. 10). Similarly, divergent actuation system 300 may rotate divergent flaps 106 between the radially outward position (e.g. FIG. 9) and the radially inward position (e.g., FIG. 10). Thus, convergent actuation system 200 and divergent actuation system 300 may independently operate convergent flaps 104 and divergent flaps 106, respectively. Alternatively, convergent actuation system 200 and divergent actuation system 300 may dependently operate with respect to each other.

Figure 11:
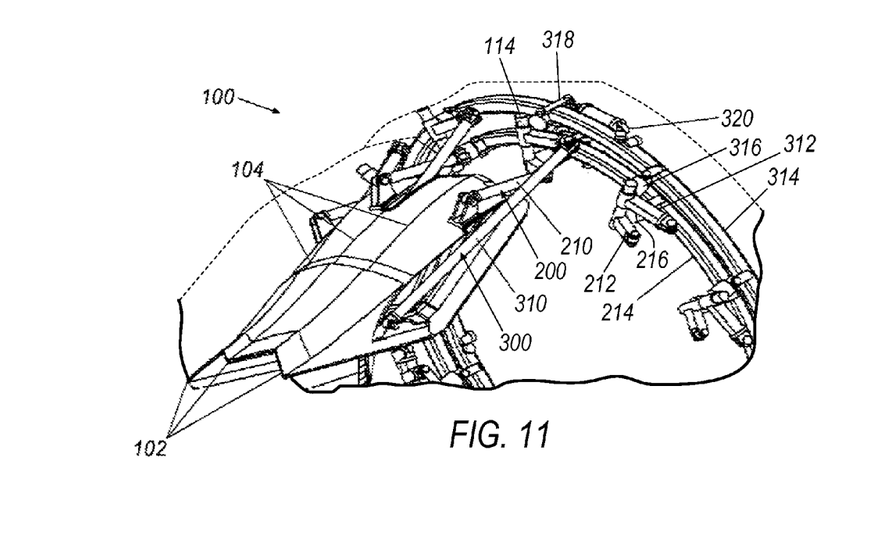
FIG. 11 illustrates an enlarged perspective cutaway view of a compact actuation system of an exemplary nozzle, for example, including convergent and divergent actuation systems.
Figure 12:
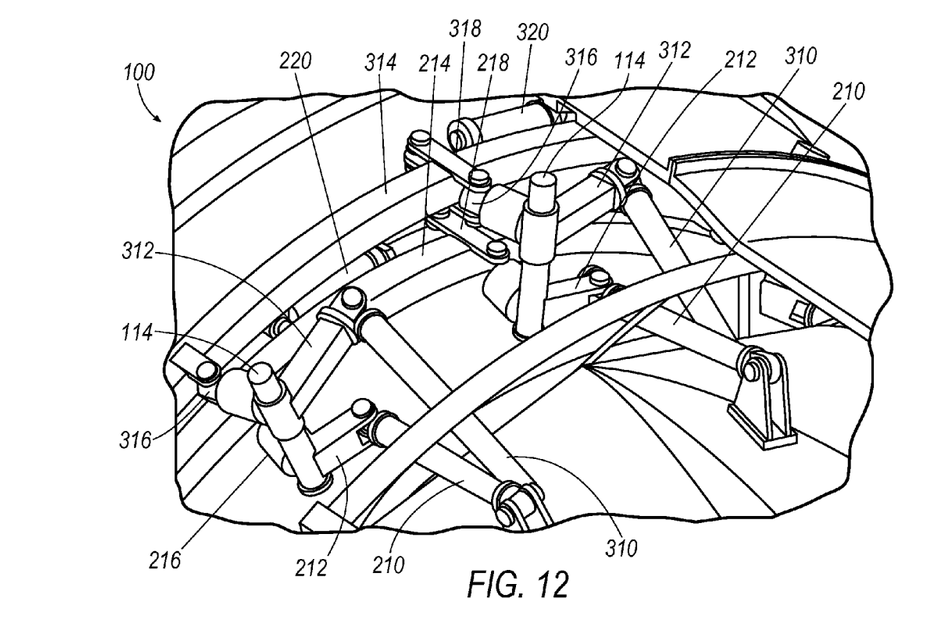
FIG. 12 illustrates an enlarged perspective cutaway view of a compact actuation system of an exemplary nozzle, for example, including actuators, bell cranks, and links.

More specifically, the convergent actuation system 200 of nozzle 100 may include convergent flaps 104, connecting links 210, bell cranks 212, sync ring 214, telescoping inputs 216, transfer link 218, and actuator 220 (not shown). FIG. 11. Connecting links 210 may be pivotally attached to a respective one of the convergent flaps 104. The nozzle 100 may further have a plurality of bell cranks 212 rotatably carried by post 114 radially extending from engine body 108, each bell crank 212 being pivotally attached to the connecting links 210 with an output arm and to telescoping input 216 with an input arm. FIG. 12. The nozzle 100 may further have sync ring 214, which may be rotatably carried by the engine body 108 and pivotally attached to each bell crank 212 with transfer link 218.

Figure 13:
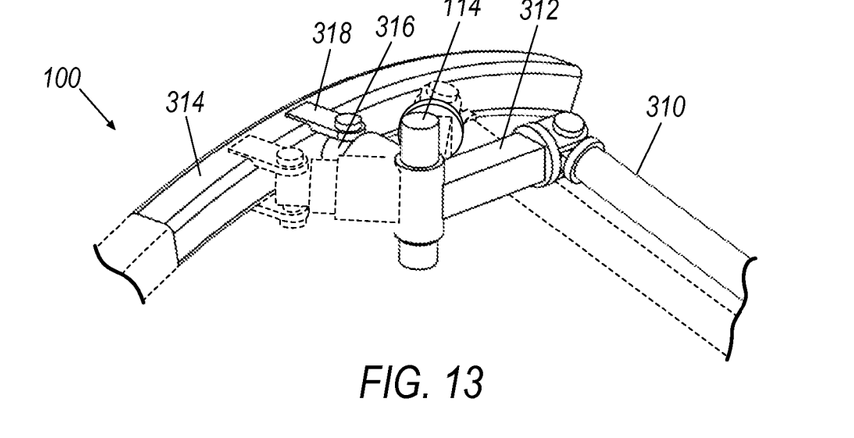
FIG. 13 illustrates an enlarged perspective cutaway view of a compact action system of an exemplary nozzle, for example, including the telescoping input.
Figure 14:
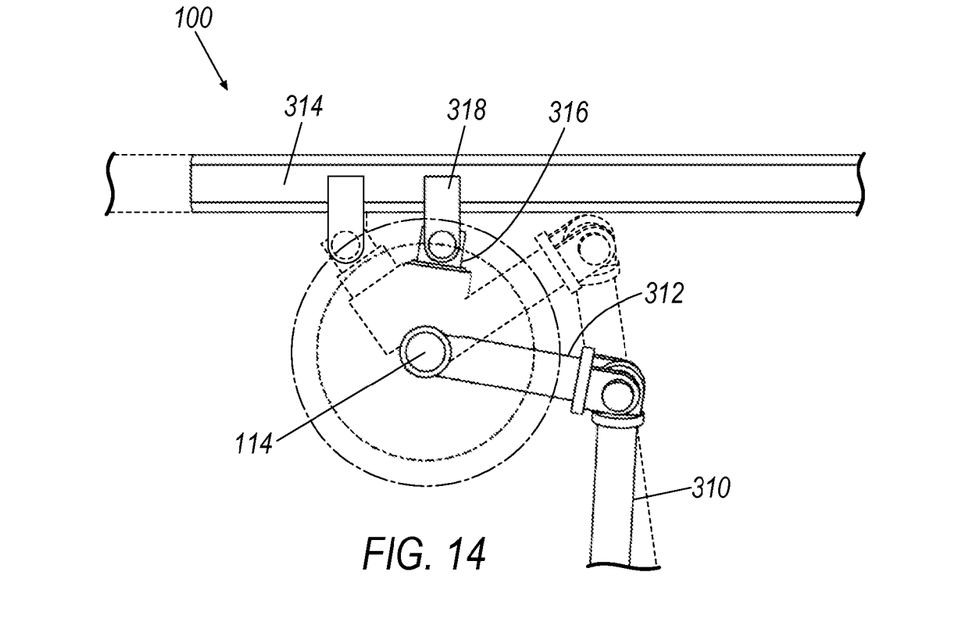
FIG. 14 illustrates a top cutaway view of the compact action system of FIG. 13, for example, including the telescoping input.

Rotation of sync ring 214 may pivot each of the bell cranks 212, which may in turn displace the convergent flap connecting links 210 for synchronously moving the convergent flaps 104 between the radially outward inward position (e.g., FIG. 13) and radially outward position (e.g., FIG. 14). See FIG. 12. Sync ring 214 may be carried by the engine body 108 for rotation in a substantially circumferential direction, while being constrained an axial direction of the engine 10, in response to the arcuate pivoting movement of the bell cranks 212. Thus, sync ring 214 may be configured to simultaneously actuate a plurality of convergent flaps 104. Alternatively, sync ring 214 may be configured for incremental actuation.

Similarly, the divergent actuation system 300 of nozzle 100 may include divergent flaps 106, connecting links 310, bell cranks 312, sync ring 314, telescoping inputs 316, transfer link 318, and actuator 320. FIG. 11. Connecting links 310 may be pivotally attached to a respective one of the divergent flaps 104. The nozzle 100 may further have a plurality of bell cranks 312 rotatably carried by post 114 of the engine body 108 and disposed above or below each bell crank 212, each bell crank 312 being pivotally attached to connecting links 310 with an output arm and to telescoping input 316 with an input arm. The nozzle 100 may further have a sync ring 314, which may be rotatably carried by the engine body and pivotally attached to each bell crank 312 with transfer link 316. FIG. 12. Rotation of the sync ring 314 may pivot each of the bell cranks 312, which may in turn displace the divergent flap connecting links 310 for synchronously moving the divergent flaps 104 between the radially inward position (e.g., FIG. 13) and radially inward position (e.g., FIG. 14). Sync ring 314 may be carried by the engine body 108 for rotating in substantially circumferential direction, while being substantially constrained in an axial direction of the engine 10, in response to the arcuate pivoting movement of the bell cranks 312. Thus, sync ring 314 may be configured to simultaneously actuate a plurality of divergent flaps 106. Alternatively, sync ring 314 may be configured for incremental actuation.

Telescoping inputs 216, 316 may be configured to accommodate for movement of respective input arms of bell crank 212, 312 and respective sync rings 214, 314. FIGS. 13-14. Telescoping inputs 216, 316 may include telescoping rods of any shape, e.g. with a circular or polygonal (not shown) cross section and with hinged or uni-ball (not shown) ends. Telescoping inputs 215, 316 may be configured to slide in a radial direction along a clevis pin held by each respective transfer link 318, for example, to accommodate for movement of respective input arms of bell crank 212, 312. FIG. 13. Telescoping inputs 216, 316 may also be configured to telescope or change in length, for example, to accommodate for rotation of each respective sync rings 214, 314. FIG. 14. Telescoping inputs 216, 316 may further be configured to twist relative to themselves to translate force from respective sync rings 216, 316 to rotation of respective bell cranks 212, 312 about post 114 while accommodating for unwanted loads from relative rotation of respective telescoping inputs 216, 316 and unwanted loads in the radial and ring axis directions. In an alternative embodiment, telescoping inputs 216, 316 may include an outer rectangular tube disposed outside an inner rectangular tube with a spherical uni-ball connected to and sliding along the clevis pin of each respective transfer link 218, 318, which may allow the uni-ball to accommodate for unwanted loads from relative rotation and unwanted loads in the radial and ring axis directions.

Figure 15:
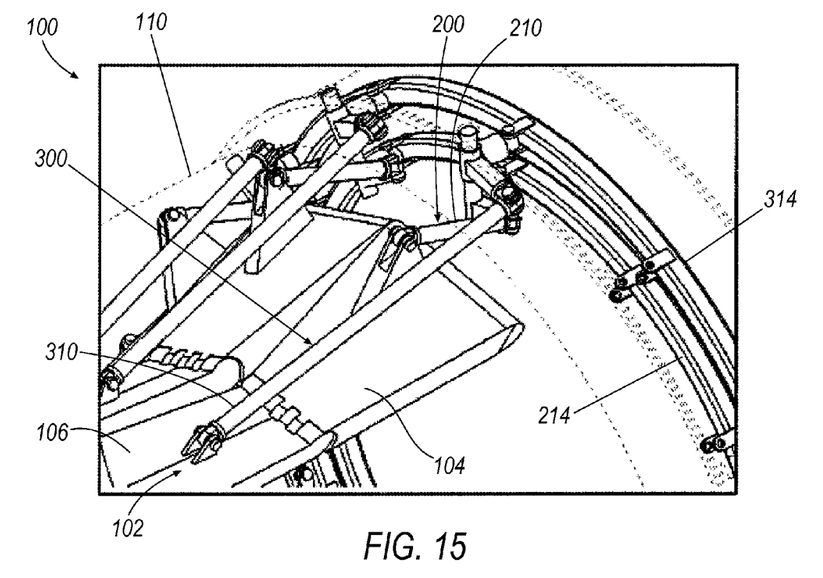
FIG. 15 illustrates a perspective cutaway view of a compact actuation system of an exemplary nozzle, for example, in a radially outward position.

In operation, convergent actuation system 200 may control the throat passage 118 and divergent actuation system 300 may control the variable flow passage 120. As shown in FIG. 15, convergent actuation system 200 may actuate convergent flaps 104 to the radially outward position to provide a maximum throat passage 118 and divergent actuation system 300 may actuate divergent flaps 106 to the radially outward position to provide a minimum variable area passage 120, for example, to provide the first configuration or afterburner mode. Furthermore, as shown in FIG. 2 discussed above, convergent actuation system 200 may actuate convergent flaps 104 to the radially inward position to provide a minimum throat passage 118 and divergent actuation system 300 may actuate divergent flaps 106 to the radially outward position to provide a minimum variable area passage 120, for example to provide the second configuration or military power mode.

Figure 16:
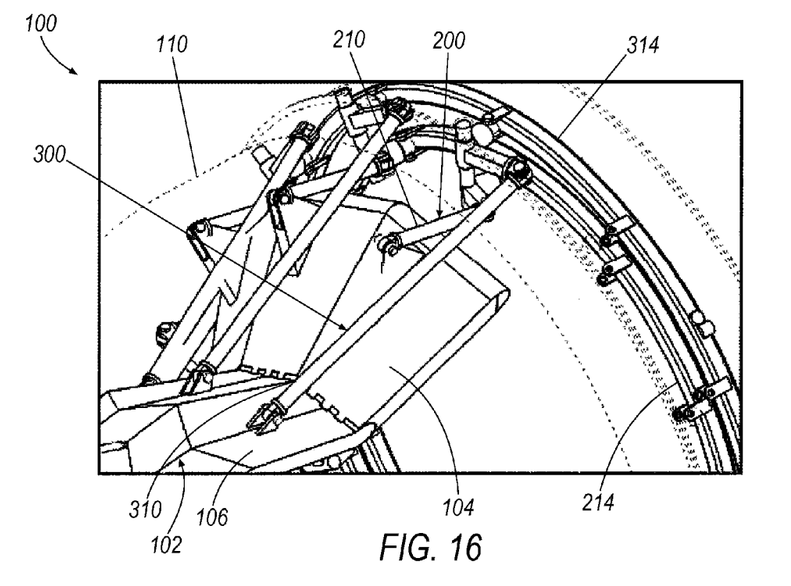
FIG. 16 illustrate a perspective cutaway view of a compact actuation system of an exemplary nozzle, for example, in a radially inward position.
Figure 17:
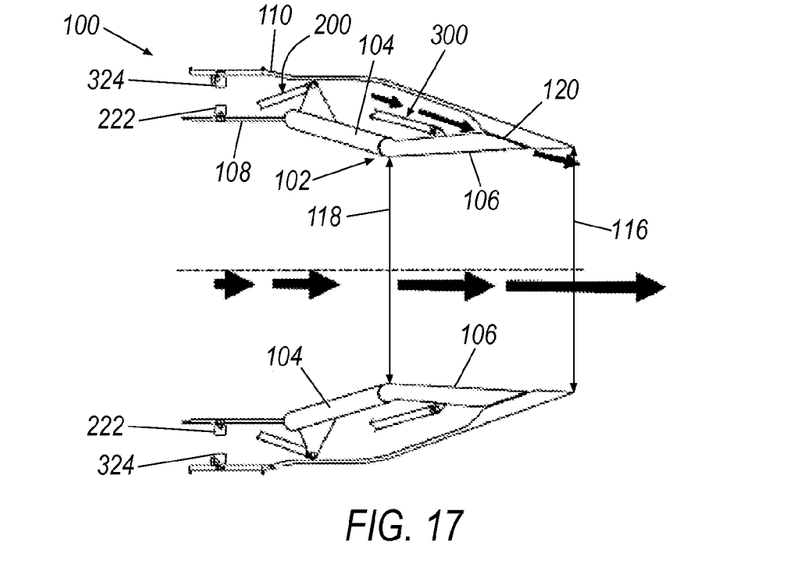
FIG. 17 illustrates a schematic view of the exemplary nozzle of FIG. 7, for example, in the first configuration with a maximum throat passage and a minimum variable area passage.
Figure 18:
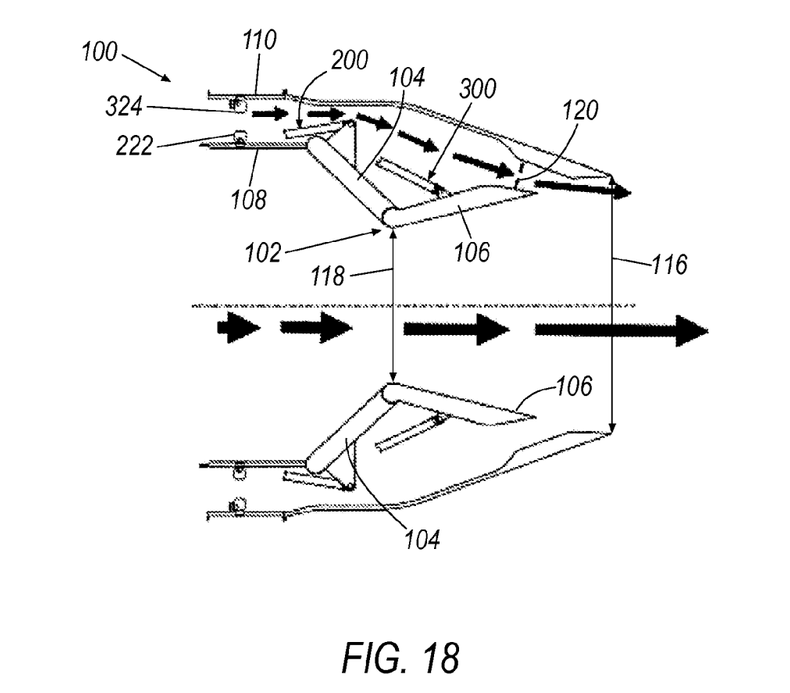
FIG. 18 illustrates a schematic view of the exemplary nozzle of FIG. 8, for example, in the third configuration with a minimum throat passage and a maximum variable area passage.
Figure 19:
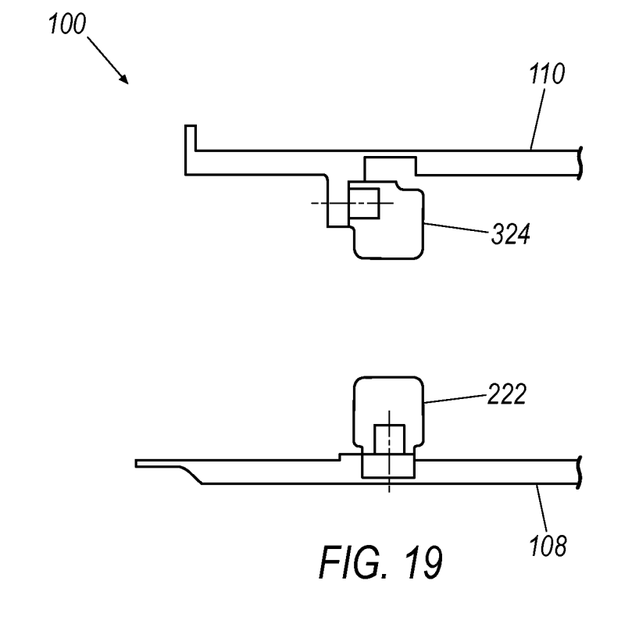
FIG. 19 illustrates a closer schematic view of the exemplary nozzle of FIGS. 17 and 16, for example, including an axial roller and a radial roller.
Figure 20:
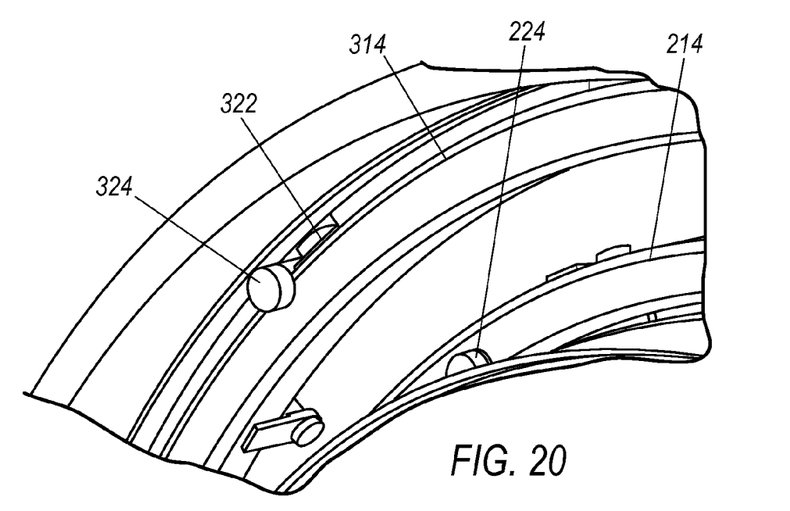
FIG. 20 illustrates a cutaway perspective view of FIG. 4, for example, including sync rings and rollers.
Figure 21:
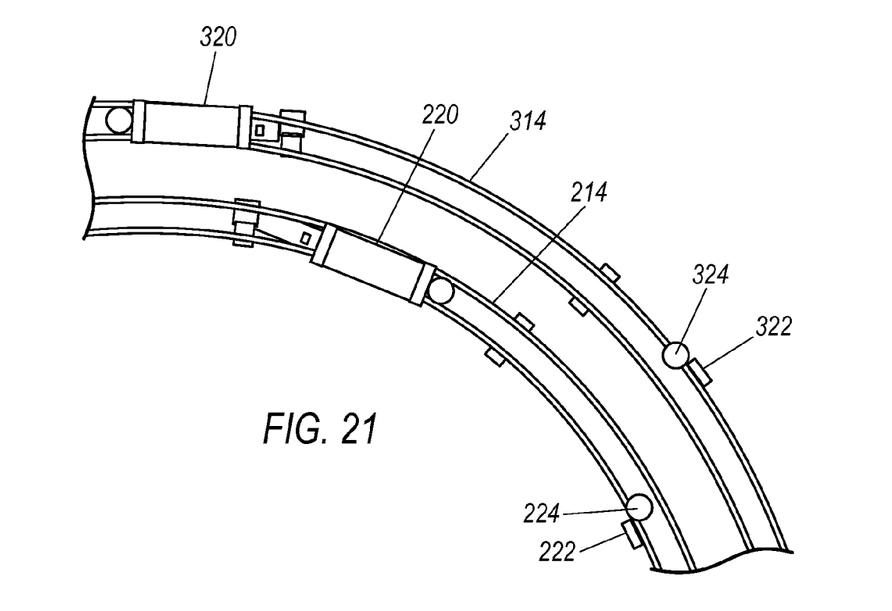
FIG. 21 illustrates a cutaway front view of FIG. 4, for example, including actuators and rollers.

As shown in FIG. 16, convergent actuation system 200 may actuate convergent flaps 104 to the radially inward position to provide a minimum throat passage 118 and divergent actuation system 300 may actuate divergent flaps 106 to the radially inward position to provide a maximum variable area passage 120, for example to provide the third configuration or cruise mode. In addition, convergent actuation system 200 and divergent actuation system 300 may be configured to incrementally position convergent flaps 104 and divergent flaps 106, respectively, to provide an intermediate area between the minimum and maximum flow areas.

Nozzle 100 may be configured to reduce the size of nozzle 100 while constraining axial and radial movement of the sync rings 214 and 314. For example, sync rings 214 and 314 are concentric reduce or minimize the axial length of nozzle 100. Furthermore, each bell crank 312 may be rotatably carried on post 114 above or below bell crank 312, thereby further providing a well packaged, compact actuation system. Moreover, sync ring 214 may be constrained to a single degree of freedom, e.g., about a central axis of sync ring 214 or engine 10, that may allow actuator 220 to synchronously control and maintain substantially the same inward or outward position for all convergent flaps 104 with respect to the central axis. Similarly, sync ring 314 may be constrained to a single degree of freedom, e.g., about a central axis of sync ring 314 or engine 10, that may allow actuator 320 to synchronously control and maintain substantially the same inward or outward position for all divergent flaps 106 with respect to the central axis.

Two or more actuators 220, 320 may reduce or minimize binding friction with respect to engine body 108 thereby allowing the stiffness characteristics of sync rings 214, 314 to distribute force imbalances between the plurality of actuators 220, 320. The force may result from machining tolerances, as no two actuators will produce the same force for the same supply and return pressure. Each of sync rings 214, 314 may each utilize a hydraulic control unit to control a supply and return pressure to each plurality of actuators 220, 320 based on a position feedback of one or more actuators 220, 320, for example, from one or more positions sensors. Thus, each of sync rings 214, 314 may synchronize the movement of all respective actuators 220, 320 thereby causing each actuator 220, 320 to displace equally in response to force imbalances between actuators 220, 320.

Figure 22:
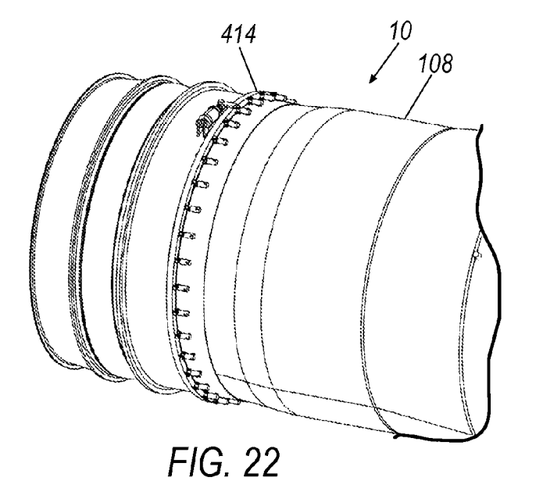
FIG. 22 illustrates a perspective view of an inlet side an engine of the present disclosure.
Figure 23:
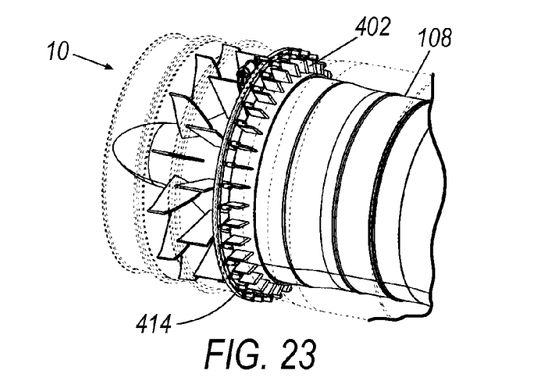
FIG. 23 illustrates another perspective view of the inlet side of FIG. 22, for example, including guide vanes.
Figure 24:
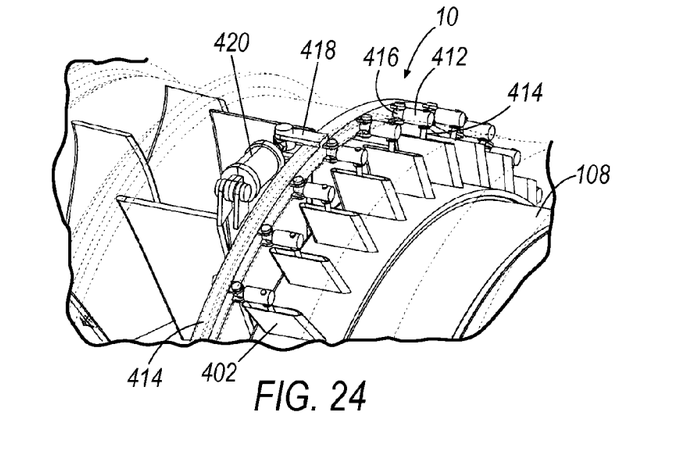
FIG. 24 illustrates a closer perspective view of the guide vanes of FIG. 23.

Referring to FIGS. 22-24, engine 10 may include a single sync ring. The sync ring 414 may be configured to rotate a set of convergent-divergent flaps 102 (e.g., described above) or a plurality guide vanes 402 (e.g., FIGS. 23-24) positioned relative to any duct (e.g., with respect to a compressor) of engine 10. For example, the sync ring 414 may be actuated by one or more actuators 420 to rotate a plurality of guide vanes 426 of engine 10. Rotation of the sync ring 414 may be translated across a plurality of transfer links to a plurality of respective telescoping inputs 416, which may be configured to telescope with respect to and rotate a plurality of respective input arms of a plurality of bell cranks 412. FIG. 24. The plurality of bell cranks 412 may be configured to rotate a plurality of guide vanes 402 about respective radial axes of a plurality of posts 414 of engine body 108. Thus, the sync ring 414 may be configured to synchronously rotate the plurality of guide vanes 402 about the respective posts 414 of the engine body 108 to adjust and direct flow streams into the engine 10. Alternatively, two or more sync rings 414 may be concentrically positioned (e.g., as discussed above) or may be positioned with respect to one or more other ducts of engine 10.

The exemplary embodiments herein may be used in conjunction with any actuation system of any vehicle including any engine or nozzle system thereof. Merely as examples, embodiments of the present disclosure may include or be used in conjunction with any of the systems and methods disclosed in the crossed-referenced disclosures mentioned above, which have been incorporated herein.

It will be appreciated that the aforementioned method and devices may be modified to have some components and steps removed, or may have additional components and steps added, all of which are deemed to be within the spirit of the present disclosure. Even though the present disclosure has been described in detail with reference to specific embodiments, it will be appreciated that the various modifications and changes can be made to these embodiments without departing from the scope of the present disclosure as set forth in the claims. The specification and the drawings are to be regarded as an illustrative thought instead of merely restrictive thought.

What is claimed is:

1. An actuation system for an exhaust nozzle of a gas turbine engine, comprising:
   a plurality of flap assemblies including a plurality of convergent flaps movable between first and second convergent positions and a plurality of divergent flaps movable between first and second divergent positions, each of the plurality of divergent flaps extending from a respective one of the plurality of convergent flaps;
   a first sync ring rotatably carried by an engine body and configured to synchronously move the plurality of divergent flaps between the first and second divergent positions;
   a second sync ring rotatably carried by the engine body and configured to synchronously move the plurality of convergent flaps between the first and second convergent positions; and
   a first actuator configured to rotate the first sync ring about an engine axis of the engine body.

2. The actuation system of claim 1, further comprising a first connecting link operatively connecting the first sync ring to each of the plurality of divergent flaps.

3. The actuation system of claim 2, further comprising a second connecting link operatively connecting the second sync ring to each of the plurality of convergent flaps.

4. The actuation system of claim 1, further comprising a second actuator configured to rotate the second sync ring about the engine axis.

5. The actuation system of claim 1, wherein the first and second sync rings are configured to be concentrically positioned with respect to each other.

6. The actuation system of claim 1, further comprising:
a first plurality of bell cranks coupled to the first sync ring and a respective one of the plurality of divergent flaps; and
a second plurality of bell cranks coupled to the second sync ring and a respective one of the plurality of convergent flaps.

7. An actuation system for an exhaust nozzle of a gas turbine engine, comprising:
a plurality of flap assemblies including a plurality of convergent flaps movable between first and second convergent positions and a plurality of divergent flaps movable between first and second divergent positions, each of the plurality of divergent flaps extending from a respective one of the plurality of convergent flaps;
a first plurality of bell cranks coupled to a respective one of the plurality of divergent flaps; and
a second plurality of bell cranks coupled to a respective one of the plurality of convergent flaps; and
a first actuator configured to rotate a first sync ring about an engine axis of an engine body.

8. The actuation system of claim 7, further comprising a first connecting link operatively connecting the first sync ring to each of the plurality of divergent flaps.

9. The actuation system of claim 8, further comprising a second connecting link operatively connecting a second sync ring to each of the plurality of convergent flaps.

10. The actuation system of claim 7, further comprising a second actuator configured to rotate a second sync ring about the engine axis.

11. The actuation system of claim 7, wherein the first sync ring and a second sync ring are configured to be concentrically positioned with respect to each other.

12. The actuation system of claim 7, further comprising:
the first sync ring rotatably carried by the engine body and coupled to the first plurality of bell cranks for synchronously moving the plurality of divergent flaps between the first and second divergent positions; and
a second sync ring rotatably carried by the engine body and coupled to the second plurality of bell cranks for synchronously moving the plurality of convergent flaps between the first and second convergent positions.

13. A method of operating an actuation system, comprising:
rotating a sync ring about a central axis of the sync ring with an actuator, the sync ring being operatively connected to an input arm of a bell crank, the bell crank being rotatable about a radial axis perpendicular to the central axis, wherein a telescoping input is operatively disposed between the actuator and the input arm of the bell crank;
translating the rotation of the sync ring to a connecting link with an output arm of the bell crank;
urging the connecting link in an axial direction with the output arm of the bell crank; and
moving a vehicle surface to a radially outward or inward position with the connecting link.

14. The method of claim 13, wherein the vehicle surface includes a flap of a nozzle.

15. The method of claim 14, further comprising opening a variable area passage by moving the vehicle surface to the radially inward position.

16. The method of claim 14, further comprising closing a variable area passage by moving the vehicle surface to the radially outward position.

17. The method of claim 13, further comprising rotating a second sync ring to urge a second connecting link to move a second vehicle surface to a radially outward or inward position.

* * * * *